United States Patent [19]

Beimesch et al.

[11] Patent Number: 4,497,757

[45] Date of Patent: Feb. 5, 1985

[54] ENERGY EFFICIENT HYDRATION PROCESS

[75] Inventors: Wayne E. Beimesch, Covington, Ky.; Thomas C. Hortel, Cincinnati, Ohio

[73] Assignee: The Procter & Gamble Company, Cincinnati, Ohio

[21] Appl. No.: 462,293

[22] Filed: Jan. 31, 1983

[51] Int. Cl.[3] ......................... B29C 6/00; B29C 23/00

[52] U.S. Cl. .......................................... 264/13; 34/9; 34/12

[58] Field of Search .................. 34/9, 312, 95; 264/13

[56] References Cited

U.S. PATENT DOCUMENTS 3,703,772 11/1972 McHugh et al. ........................ 34/12

4,091,544 5/1978 Hutchins .................................. 34/9

*Primary Examiner*—Jay H. Woo

*Assistant Examiner*—Mike McGurk

*Attorney, Agent, or Firm*—Richard C. Witte; Ronald L. Hemingway; Leonard Williamson

[57] ABSTRACT

A process for hydrating in a spray tower a water-wet mixture of materials, at least one of which is hydratable, which allows the mixture to be easily formed into the desired size and shape and easily and safely dried.

13 Claims, No Drawings

ENERGY EFFICIENT HYDRATION PROCESS

BACKGROUND OF THE INVENTION

The present invention is related to a process for forming spheroidal-like particles from a water-wet mixture of materials, at least one of which is hydratable. The process involves allowing the mixture to be formed into spherical particles in a spray tower. The chosen forms are then cooled to a temperature sufficiently low so that the hydratable material is hydrated. The material is heated to a temperature which allows the water of hydration and free water to be driven off. This process allows for the elimination of the need for further size reduction and the associated dust.

Dry mixtures of materials are desirable in many different situations. Included among these situations are the inclusion of a solid diluent with such materials as a dry peroxyacid compound, a surfactant compound, a dry fertilizer material or an enzyme. These materials are only a few of the many which may be benefited by the present process's ability to: (1) form particles which are quickly dried; and (2) form small particles without the usual inherent dustiness associated with such formation.

The prior art contains many references which disclose compositions containing mixtures of hydratable materials with nonhydratable materials. Most such references, however, are not concerned with utilizing the hydratable materials as a drying aid and, hence, do not address the favorable and unfavorable aspects of such use. One reference which does disclose the use of a hydratable material as a drying aid is U.S. Pat. No. 3,770,816, to Nielsen, issued Nov. 6, 1973. This reference, while disclosing the use of a hydratable material to dry a nonhydratable material, diperisophthalic acid, does not disclose that the drying process has critical parameters which must be controlled. U.S. Pat. No. 4,091,544, to Hutchins, issued May 30, 1978, while disclosing that the drying process has critical parameters which must be controlled, does not disclose critical parameters for spray hydration operation of such mixtures. Notwithstanding the teachings of Hutchins, those skilled in the art for years used expensive liquid carbon dioxide ($CO_2$) in spray tower hydration operations to reduce the temperature of the particles 25°-30° C. below the hydration temperature, believing that the colder the air inlet temperature the better the hydration process. The use of $CO_2$ was not only costly, but processing also caused problems in spray hydration operations.

It is, therefore, an object of this invention to provide a superior process for the spray hydration of a mixture of hydratable and nonhydratable materials in a spray tower.

It is also an object of the present invention to optimize the hydration of the particles.

Another object of the present invention is to reduce cost by eliminating the need for liquid $CO_2$ to cool spray tower inlet air, etc.

Still other objects are to make hydrated particles which are easy to handle and which are chemically stable.

These and other objects of the present invention will become apparent from the following disclosure.

All percentages and ratios used herein are by weight unless otherwise specified.

SUMMARY

The present invention relates to a process for hydrating a mixture of hydratable materials and nonhydratable materials. The process involves the careful controlling of the spray tower hydration temperatures to ensure improved hydration of the hydratable material and the proper degree of subsequent water removal without the formation of adverse product properties.

DETAILED DESCRIPTION OF THE INVENTION

The hydration process of the present invention comprises the following steps:

A. Forming a water-wet mixture of a hydratable material and a nonhydratable material at a temperature which is higher than the temperature of hydration of the hydratable material, preferably 2°-15° C. higher;

B. Forming the mixture of (A) into spheroidal units of from 50 to 2000 microns via a spray nozzle;

C. Decreasing the temperature of the units of (B) to a spray tower exit temperature of 10°-20° C. below the temperature of hydration of the hydratable material via spray tower inlet air; and D. Drying the units of (C) at a temperature high enough to remove free water and water of hydration to a final moisture content of less than about 1%, preferably less than about 0.5%, which temperature is preferably not so high as to cause the units to soften and stick together and/or degrade.

The conditions for carrying out the process outlined above can be readily determined by the formulator for the combination of materials chosen for drying. It is to be appreciated that while a single hydratable material and a single nonhydratable material are shown in the above description, more than one of both types of agents may be employed in the present process.

Included among the extensive number of hydratable materials suitable for use in the process herein are sodium sulfate, calcium bromide, ferric bromide, ferric chloride, ferric nitrate, lithium bromide, sodium acetate, sodium arsenate, sodium perborate, sodium phosphite, sodium acid phosphite, stannous chloride, among many others. A preferred member of this group is sodium sulfate. If certain ions are undesirable for the use to which the dried mixture is to be put, compounds containing them are preferably avoided. For example, mixtures for use in a clothes washer should preferably not contain excessive amounts of iron compounds.

The nonhydratable materials as indicated hereinbefore can be any material which the formulator desires to combine with the hydratable material. The following are only a small example of the many agents which may find use in the present invention. Included are solid peroxyacid materials, surfactants, enzymes, fertilizers and other solid bleaching agents such as sodium hypochlorite.

A preferred nonhydratable material for use in the present process is a normally solid peroxyacid compound. A compound is "normally solid" if it is in dry or solid form at room temperature. Such peroxyacid compounds are the organic peroxyacids and water-soluble salts thereof which in aqueous solution yield a species containing a —O—O$^-$ moiety. These materials have the general formula

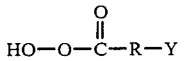

wherein R is an alkylene group containing 1 to about 20 carbon atoms or a phenylene group and Y is hydrogen, halogen, alkyl, aryl or any group which provides an anionic moiety in aqueous solution. Such Y groups can include, for example,

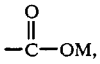, 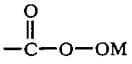 or 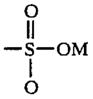

wherein M is H or a water-soluble, salt-forming cation.

The organic peroxyacids and salts thereof operable in the instant invention can contain either one or two peroxy groups and can be either aliphatic or aromatic. When the organic peroxyacid is aliphatic, the unsubstituted acid has the general formula

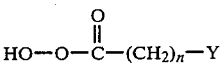

where Y, for example, can be $CH_3$, $CH_2Cl$,

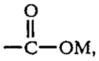, 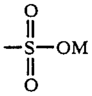 or 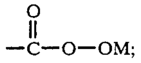;

and n can be an integer from 1 to 20. Perazelaic acid (n=7) and perdodecanedioic acid (n=10) where Y is

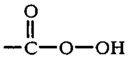

are the preferred compounds of this type. The alkylene linkage and/or Y (if alkyl) can obtain halogen or other noninterfering substituents.

When the organic peroxyacid is aromatic, the unsubstituted acid has the general formula

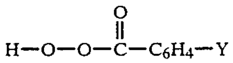

wherein Y is hydrogen, halogen, alkyl,

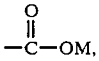, 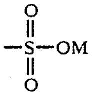 or 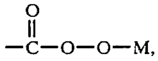, for example. The percarboxy and Y groupings can be in any relative position around the aromatic ring. The ring and/or Y group (if alkyl) can contain any noninterfering substituents such as halogen groups. Examples of suitable aromatic peroxyacids and salts thereof include monoperoxyphthalic acid, diperoxyterephthalic acid, 4-chlorodiperoxyphthalic acid, the monosodium salt of diperoxyterephthalic acid, m-chloroperoxybenzoic acid, p-nitroperoxybenzoic acid, and diperoxyisophthalic acid.

Of all the above-described organic peroxyacid compounds, the most preferred for use in the instant process are diperdodecanedioic acid and diperazelaic acid.

The amount of moisture present in the water-wet mixture of (A) varies. Depending upon the amount of hydratable material desirable (acceptable) in the final composition, various amounts of water may be bound to the hydratable material in the form of waters of hydration. Generally, however, the amount of water will be from about 15% to 40% based on the weight of all of the components present in the mixture. For mixtures containing sodium sulfate the mixture has a moisture to sodium sulfate ratio of from 0.3:1 to 0.9:1.

The formation of the mixture of step (A) into smaller units as specified in step (B) is done by pumping the mixture through a nozzle into a tower having the temperature desired in step (C).

The temperature to which the units of step (B) is reduced in Step (C) is 10°-20° C. below the hydration temperature of the hydratable materials(s) selected for use. It is desirable to surface harden the particles. If a mixture of hydratable materials is used, the temperature of Step (C) can be determined by considering the total amount of hydratable materials present and their hydration temperatures. Examples of various hydratable materials and their approximate hydration temperatures are given below:

| Material | °F. | °C. |
|---|---|---|
| Calcium bromide | 101 | 38 |
| Ferric bromide | 81 | 27 |
| Ferric chloride | 99 | 37 |
| Ferric nitrate | 95 | 35 |
| Lithium bromide | 111 | 44 |
| Sodium acetate | 136 | 58 |
| Sodium arsenate | 82 | 28 |
| Sodium phosphate | 94 | 34 |
| Sodium perborate | 104 | 40 |
| Sodium acid phosphite | 108 | 42 |
| Stannous chloride | 100 | 38 |
| Zinc nitrate | 98 | 37 |
| Sodium sulfate | 90 | 32 |

For assurance of optimum hydration and quicker solidification, the temperature of Step (C) should be reduced 12°-18° C. below the above values. The achievement of the desired temperature can be made in a number of different ways including conventional heat exchangers, blowing air and temperature controlled spraying towers. The time of exposure to this low temperature can be varied by the processor and will be determined largely by the amount of hydratable materials present and the thickness of the individual particles. The temperature and time of exposure, therefore, can easily be determined by the processor depending on the type of equipment used and the physical properties of the individual particles.

Prior to this invention, it was believed that the colder the temperature of Step (C) the more the hydration. It was surprisingly discovered that the actual amount of hydration increased with warmer spray tower temperatures, i.e., producing particles having temperatures 10°-20° C. below the hydration temperature of the hydrate.

The drying of the solid particles in step (D) is for the purpose of removing the amount of free water and water of hydration desired by the formulator. In certain instances, as with the preferred peroxyacid compounds, it is desirable to remove virtually all of the water to improve the available oxygen stability of the peroxyacid. The air temperature must not be allowed, however, to reach a point where the shaped particles would become soft and stick together or affect the product's stability. Such problems occur at different air temperatures depending on the hydratable material used and the size and shape of the particles.

The broad and preferred ranges for dry bulb air temperature (DBT) with corresponding dew point temperatures (DPT) for Step D of the process of this invention when the water-wet mixture (A) is based on sodium sulfate is set out in Table I. The wet bulb temperature for Step D should not exceed 32° C., and is preferable about 27° C.

TABLE I

| | Step D Drying Temperatures | |
|---|---|---|
| | DBT °C. | DPT °C. |
| Broad Ranges | 93 to 49 | −18 to 19 |
| Preferred Ranges | 77 to 66 | −3 to 10 |

Dry Bulb Temperature is the temperature indicated by a dry bulb thermometer that is the actual temperature of the air.

Dew Point is the temperature at which a given mixture of air and water vapor is saturated with water vapor.

Wet Bulb Temperature is the dynamic equilibrium temperature attained by a water surface when exposed to air is a manner such that the sensible heat transferred from the gas to the liquid is equal to the latent heat carried away by evaporation of water vapor into the gas.

When the nonhydratable material is a peroxyacid and a low level of residual moisture is desired, it is necessary that steps be taken to ensure that the drying temperature does not allow the peroxyacid to exothermally decompose. Another way to help control the exotherm problem is to put an agent into the mixture which can release water at about the exotherm point, whereby controlling it. Agents of this type will be discussed subsequently. Of course, where the materials dried do not pose a safety problem of the exothermal decomposition type, it is not necessary to take such precautionary steps. The time of exposure to the drying temperature is variable depending on the temperature chosen, the hydratable material, the thickness of the individual particles and the drying technique, but will generally be from about several minutes to several hours at a DBT of 49° to 93° C. with a DPT of 19° to −18° C. maintain a web bulb temperature of less than 32° C. The actual unit used for this final drying can be any which does not involve the particles pressing together. Included are fluid bed dryers, moving belt dryers (forced air circulation), and any kind of forced air circulation dryers such as the Wyssmont Turbodryer supplied by Wyssmont Company of Ft. Lee, N.J.

The drying temperature must be sufficient to evaporate moisture from the surface of the particles without saturating the surface to the point that the particle surface becomes "sticky", e.g., the particles of (C) can be dried by gradually increasing their temperature in a fluidized bed, e.g., from ambient (5 minutes) to 60° C. (10 minutes) to 71° C. (10 minutes) to 82° C. (10 minutes) and then 93° C. for 10 minutes.

It is readily seen that the dried mixtures prepared by the above-described process can be used in whatever end product form the formulator desires. Since one of the preferred materials for use herein is a peroxyacid bleaching agent, agents which are desirable for use with the bleach are described below.

TOTAL COMPOSITION

In formulating a total composition containing the dried units of the process of the present invention wherein a peroxyacid is the nonhydratable material of choice, certain additional components are desirable. The compositions containing the peracid compound, which is preferably in granular particulate form, may contain agents which aid in making the product completely safe, as well as stable. These agents can be designated as carriers.

It is well documented in the peroxyacid literature that peroxyacids are susceptible to a number of different stability problems, as well as being likely to cause some problems. Looking at the latter first, peroxyacids, decompose exothermally and when the material is in dry granular form the heat generated must be controlled to make the product safe. The best exotherm control agents are those which are capable of liberating moisture at a temperature slightly below the decomposition temperature of the peroxyacid employed. U.S. Pat. No. 3,770,816, to Nielsen, issued Nov. 6, 1973, incorporated herein by reference, discloses a wide variety of hydrated materials which can serve as suitable exotherm control agents. Included among such materials are magnesium sulfate heptahydrate, magnesium formate dihydrate, calcium sulfate dihydrate, calcium lactate hydrate, calcium sodium sulfate dihydrate, and hydrated forms of such things as sodium aluminum sulfate, potassium aluminum sulfate, ammonium aluminum sulfate and aluminum sulfate. Preferred hydrates are alkali metal aluminum sulfates, particularly preferred is potassium aluminum sulfate. Other preferred exotherm control agents are those materials which lose water as the result of chemical decomposition such as boric acid, malic acid and maleic acid. The exotherm control agent is preferably used in an amount of from about 100% to about 200% based on the weight of the peroxyacid compound.

The other problems faced when peroxyacid compounds are used fall into the area of maintaining good bleach effectiveness. It has been recognized that metal ions are capable of serving as catalyzing agents in the degradation of the peroxyacid compounds. To overcome this problem chelating agents can be used in an amount ranging from 0.005% to about 1.00% based on the weight of the composition to tie up heavy metal ions. U.S. Pat. No. 3,442,937, to Sennewald et al., issued May 6, 1969, discloses a chelating system comprising quinoline or a salt thereof, an alkali metal polyphosphate and, optionally, a synergistic amount of urea. U.S. Pat. No. 2,838,459, to Sprout, Jr., issued June 10, 1958, discloses a variety of polyphosphates as stabilizing agents for peroxide baths. These materials are useful herein as stabilizing aids. U.S. Pat. No. 3,192,255, to Cann, issued June 29, 1965, discloses the use of quinaldic acid to stabilize percarboxylic acids. This material, as well as picolinic acid and dipicolinic acid, would also be useful in the compositions of the present invention. A preferred chelating system for the present invention is a mixture of dipicolinic acid and an acid polyphosphate preferably acid sodium pyrophosphate. The acid polyphosphate can be a mixture of phosphoric acid and sodium pyrophosphate wherein the ratio of the former to the latter is from about 0.5:1 to about 2:1 and the ratio of the mixture to dipicolinic acid is from about 0.2:1 to about 5:1.

Additional agents which may be used to aid in giving good bleaching performance include such things as pH adjustment agents, bleach activators and minors such as coloring agents, dyes and perfumes. Typical pH adjustment agents are used to alter or maintain aqueous solutions of the instant compositions within 2 to 6, preferably within the 3 to 5 pH range in which peroxyacid bleaching agents are generally most useful. Depending upon the nature of other optional composition ingredients, pH adjustment agents can be either of the acid or base type. Examples of acidic pH adjustment agents designed to compensate for the presence of other highly alkaline materials include normally solid organic and inorganic acids, acid mixtures and acid salts. Examples of such acidic pH adjustment agents include sulfuric acid, citric acid, glycolic acid, tartaric acid, gluconic acid, glutamic acid, sulfamic acid, sodium bisulfate, potassium bisulfate, ammonium bisulfate and mixtures of citric acid and lauric acid. Citric acid is preferred by virtue of its low toxicity and hardness sequestering capability.

Optional alkaline pH adjustment agents include the conventional alkaline buffering agents. Examples of such buffering agents include such salts as carbonates, bicarbonates, silicates, pyrophosphates and mixtures thereof. Sodium hydroxide, sodium borate, sodium bicarbonate, and tetrasodium pyrophosphate are highly preferred.

Optional ingredients, if utilized in combination with the active peroxyacid/hydratable material system of the instant invention to form a complete bleaching product, comprise from about 50% to about 95% by weight of the total composition. Conversely, the amount of bleaching system is from about 5% to about 50% of the composition. Optional ingredients such as the exotherm control agent and the metal chelating agent are preferably mixed with the peroxyacid and the hydratable material in step (A), thereby becoming a part of the dry units formed in the process. Others such as the pH adjustment agents are added as separate particles. Such other ingredients may be coated with, for example, an inert fatty material if the ingredients are likely to cause degradation of the peroxyacid.

The bleaching compositions as described above can also be added to and made a part of conventional fabric laundering detergent compositions. Accordingly, optional materials for the instant bleaching compositions can include such standard detergent adjuvants as surfactants and builders. Optional surfactants are selected from the group consisting of organic anionic, nonionic, ampholytic and zwitterionic surfactants and mixtures thereof. Optional builder materials include any of the conventional organic builder salts including carbonates, silicates, acetates, polycarboxylates, and phosphates. If the instant bleaching compositions are employed as part of a conventional fabric laundering detergent composition, the instant bleaching particles generally comprise from about 1% to about 40% by weight of such conventional detergent compositions. Conversely, the instant bleaching compositions can optionally contain from about 60% to about 90% by weight of conventional surfactant and builder materials. Further examples of suitable surfactants and builders are disclosed in U.S. Pat. No. 4,091,544 to Hutchins, issued May 30, 1978, incorporated herein by reference.

COMPOSITION PREPARATION

Bleaching granules prepared using the process of the present invention can be admixed with other granules of optional bleaching or detergent composition materials. Actual particle size of either the bleach containing granules or optional granules of additional material is not critical. If, however, compositions are to be realized having commercially acceptable flow properties, certain granule size limitations are highly preferred. In general, all granules of the instant compositions preferably range in size from about 50 microns to 2000 microns, more preferably from about 100 microns to 1300 microns.

Additionally, flowability is enhanced if granules of the present invention are of approximately the same size. Therefore, preferably the ratio of the average granule sizes of the bleach-containing granules and optional granules of other materials varies between 0.5:1 and 2.0:1.

Bleaching compositions of the present invention are utilized by dissolving them in water in an amount sufficient to provide from about 1.0 ppm to 100 ppm available oxygen in solution. Generally, this amounts to about 0.01% to 0.2% by weight of composition in solution. Fabrics to be bleached are then contacted with such aqueous bleaching solutions.

TEST FOR % HYDRATION

The technique used to study the hydration condition of the exiting particles involves sampling the sprayed hydrated particles of Step C of the process of this invention with a liter Dewar flask equipped with a thermometer and following the temperature rise as a function of time. After 1–2 minutes of measurement the initial particle temperature is found. From that point on the temperature rises and reaches equilibrium in about 15–25 minutes. The temperature rise is caused by continued hydration of the sodium sulfate (and accompanied release of heat) after the product exits the tower. The heat generated by hydration shows up as the temperature increases in the product. Knowing the heat of hydration and heat capacity of the particles allows a "% unhydrated water" calculation. Using this method, a 15° F. (8.3° C.) temperature rise translates to "10% unhydrated" or free water.

$$\frac{C_p(T_{final} - T_{initial})}{(\Delta H_{Hydration})\,(X_{H2O})} \times 100 = \%\ \text{free water}$$

$C_p$ = heat capacity of the wet particles, $$\frac{0.36\ \text{BTU}}{\text{lb}_m\ \text{paste}\ ^\circ\text{F.}}$$

$T_{initial}$ = initial particle temperature, °F.

$T_{final}$ = equilibrium particle temperature, °F.

$\Delta H_{Hydration}$ = heat of hydration for sodium sulfate, $$\frac{200\ \text{BTU}}{\text{lb of water}}$$

$X_{H2O}$ = weight fraction of $H_2O$ in paste, $$\frac{0.27\ \text{lb}_m\ H_2O}{\text{lb}_m\ \text{paste}}$$

for examples below.

The bleaching compositions of the instant invention are illustrated by the following examples, but not limited thereto.

EXAMPLE I

The following ingredients were added to a crutcher while stirring, adjusting the final mixture pH to about 3 to 5:

| | | |
|---|---|---|
| Diperoxydodecanedioic acid/water mixture (40% acid, 60% water) | 2.5 parts | Premix |
| Boric acid | 1.2 parts | |
| Surfactant paste (52% water, 31% $C_{13}$ linear alkyl benzene sulfonate, 17% $Na_2SO_4$) | 0.7 parts | |
| Anhydrous sodium sulfate (Hydration temperature 32° C.) | 4.4 parts | |
| Additional $H_2O$ | 0.7 parts | |
| Total | 9.5 parts | |

Equipment used: Countercurrent spray tower with nozzle atomizer as described in K. Masters' *Spray Drying Handbook*, 3rd Ed., 1979, John Wiley & Sons, N.Y., Page 30, FIG. 1.6(c), incorporated herein by reference.

The above mixture was heated to a temperature of 101° F. (38° C.) and atomized (through a Fulljet ¼G6.5 spray nozzle drilled out to an orifice of 7/64th inch (2.78 mm) into spheroidal particles having an average diameter of about 600 microns in diameter at a rate of 2000 lbs/hr (907 Kg/hr). These particles fell through a 10 ft. diameter, 35 ft. straight side spray tower and were hydrated by countercurrent cold air stream. The inlet air stream was 40° F. (4.4° C.) with a dew point of 4.4° C. The superficial velocity of the air in the tower was about 121 fpm (0.61 mps). The initial temperature of the particles exiting the tower was 62° F. (17° C.), which is 15° C. below the hydration temperature of the sodium sulfate. Some of these particles were placed in a Dewar flask and the temperature rise was measured so that percent (%) hydration could be determined. The % hydration for this example was found to be 93.2%. The particles handled very well even after several days of cold storage and did not form agglomerates because the particles were well hydrated and their surfaces were dried from the spray tower operation.

These hydrated particles were transferred to an Aeromatic Fluid Bed Dryer Model STS-100 batch-type, Aromatic, Inc.

The particles were dried by gradually increasing the inlet air temperature of the bed from ambient (5 minutes) to 60° C. (10 minutes) to 71° C. (10 minutes) to 82° C. (10 minutes) and then to 93° C. for a final 10 minutes. The dew point of the inlet air was approximately 4.4° C. The particles had a final moisture content of less than about 0.5%.

EXAMPLE II

A composition identical to that of Example I wss prepared using the same process except: the air enters the tower at 30° F. (−1° C.) and at 70 fpm (0.36 mps). The initial temperature of the particles exiting the tower was 60° F. (15° C.), which is 17° C. below the hydration temperature of sodium sulfate, and the particles were 92.5% hydrated. These units were dried in the same manner as Example I.

EXAMPLE III

A composition identical to that of Example I was prepared using prior art conditions. The air enters the tower at 16° F. (−9° C.) with liquid $CO_2$ and at 90 fpm (0.457 mps). The initial temperature of the particles exiting the tower was 44° F. (8° C.), which is 24° C. below the hydration temperature, and the particles were 87.4% hydrated. These particles had more of a tendency to agglomerate before drying than those in Examples I and II, particularly after some cold (4.4° C.) storage (48 hours plus).

EXAMPLE IV

A composition identical to that of Example I was prepared using prior art conditions. The air enters the tower at −6° F. (−21° C.) and at 70 fpm (0.36 mps). The initial temperature of the particles exiting the tower was 41° F. (5° C.) 27° C. below hydration temperature) and the particles were 84% hydrated. These particles had more of a tendency to agglomerate than Examples I and II.

What is claimed is:

1. An energy efficient process for hydrating a mixture of materials in a spray tower comprising:

A. forming a water-wet mixture of hydratable sodium sulfate and a nonhydratable material at a temperature which is higher than the 32° C., temperature of hydration of sodium sulfate;

B. forming the mixture of (A) into spheroidal units of from 50 to 2,000 microns via a spray nozzle;

C. decreasing the temperature of the units of (B) to 12°-22° C. via inlet air;

D. drying the units of (C) at a temperature high enough to remove free water and water of hydration for a final moisture content of less than about 1%.

2. A process according to claim 1 wherein the temperature of the units of (B) is decreased to 14°-20° C., which is 12°-18° C. below said hydration temperature.

3. A process according to claim 1 wherein the nonhydratable material is a normally solid peroxyacid compound.

4. A process according to claim 3 wherein the peroxyacid compound is selected from the group consisting of diperdodecanedoic acid and diperazelaic acid.

5. A process according to claim 4 wherein an exotherm control agent is included in the mixture of (A).

6. A process according to claim 1 wherein the temperature of (C) is 12° C. to 18° C. and the temperature of (D) is gradually increased from ambient up to about 94° C. and the final moisture content is less than about 0.5%.

7. A process according to claim 6 wherein the dry bulb and dew point temperature ranges from (D) are, respectively, 49° C. to 93° C. dry bulb temperature and 19° C. to −18° C. dew point temperature.

8. A process according to claim 6 wherein said dry bulb temperature is 66° C. to 77° C. and said dew point temperature is from 10° C. to −3° C.

9. A process according to claim 6, 7 or 8 wherein the units of (D) are dried in a fluidized bed at a wet bulb temperature of less than about 32° C.

10. A process according to claim 4 wherein the sizes of the units are 200 to 1300 microns.

11. A process according to claim 1 wherein the temperature of (A) is 2° to 15° C. above said temperature of hydration.

12. A process according to claim 4 wherein said mixture comprises from 15% to 50% moisture.

13. A process according to claim 9 wherein said moisture and sodium sulfate have a ratio of from 0.3:1 to 0.9:1.

* * * * *